(12) United States Patent
Chang et al.

(10) Patent No.: US 8,413,606 B2
(45) Date of Patent: Apr. 9, 2013

(54) FEED CARRIER RECEPTACLE FOR USE IN ROTARY FEED DISPENSING MECHANISM

(75) Inventors: Shih-Ming Chang, Zhejiang (CN); Jin-Jun Cao, Zhejiang (CN)

(73) Assignee: Cixi Haosheng Electronics & Hardware Co., Ltd., Zhejiang (CN)

( * ) Notice: Subject to any disclaimer, the term of this patent is extended or adjusted under 35 U.S.C. 154(b) by 17 days.

(21) Appl. No.: 13/215,238

(22) Filed: Aug. 23, 2011

(65) Prior Publication Data

US 2013/0047927 A1      Feb. 28, 2013

(51) Int. Cl.
*A01K 5/00*       (2006.01)
(52) U.S. Cl. .................. 119/57.92; 119/61.2; 119/57.91
(58) Field of Classification Search ............... 119/57.92, 119/51.01, 51.13, 57.1, 53.1, 61.2, 61.1, 119/57.91, 53, 53.5
See application file for complete search history.

(56) References Cited

U.S. PATENT DOCUMENTS

| | | | | |
|---|---|---|---|---|
| 3,749,060 A | * | 7/1973 | Wagner | 119/445 |
| 3,762,373 A | * | 10/1973 | Grossman | 119/51.11 |
| 3,822,056 A | * | 7/1974 | Hawes et al. | 366/114 |
| 3,911,867 A | * | 10/1975 | Berg, Jr. | 119/57.6 |
| 4,307,822 A | * | 12/1981 | Hardesty | 222/352 |
| 4,364,333 A | * | 12/1982 | Touchette | 119/52.4 |
| 4,841,913 A | * | 6/1989 | Forrer | 119/51.12 |
| 4,993,364 A | * | 2/1991 | Hessenauer | 119/51.11 |
| 5,069,116 A | * | 12/1991 | Marquez et al. | 99/330 |
| 5,255,631 A | * | 10/1993 | Anderson | 119/52.2 |
| 5,291,854 A | * | 3/1994 | Tzanet et al. | 119/52.2 |
| 5,303,672 A | * | 4/1994 | Morris | 119/51.11 |
| 5,894,815 A | * | 4/1999 | Hamilton | 119/61.2 |
| 6,484,665 B1 | * | 11/2002 | Brown-Canary Lawson et al. | 119/52.2 |
| 6,766,766 B1 | * | 7/2004 | Elliott | 119/57.92 |
| 6,789,503 B1 | * | 9/2004 | Gao | 119/51.11 |
| 7,798,080 B2 | * | 9/2010 | Sauder et al. | 111/185 |

\* cited by examiner

*Primary Examiner* — Yvonne Abbott
(74) *Attorney, Agent, or Firm* — Leong C. Lei

(57) ABSTRACT

A feed carrier receptacle for use in a rotary feed dispensing mechanism, which includes a box, a feed loading opening, and separation partitions. The feed loading opening is formed in the box. The separation partitions are arranged inside the box and every adjacent separation partitions and an inside surface of the box form a feed compartment, which communicates the feed loading opening and is provided with a feed discharge opening and a brush adjacent to the feed discharge opening When put into rotation, the feed loaded in the receptacle is generally rotated in unison therewith to move toward the feed discharge openings and is subject to a frictional force as contacting the brush so that the feed, when passing through the brush, is caused to rotate by itself and thus may fly over a long distance. This increases the distribution range of feed.

5 Claims, 9 Drawing Sheets

FEED CARRIER RECEPTACLE FOR USE IN ROTARY FEED DISPENSING MECHANISM

TECHNICAL FIELD OF THE INVENTION

The present invention generally relates to a receptacle for receiving and containing feed, and more particularly to a feed carrier receptacle that is combinable with a feed dispensing mechanism to dispense and distribute feed.

DESCRIPTION OF THE PRIOR ART

To breed and raise animals, such as poultry, in a wide range, it is important to handle feed dispensing and distribution in order to benefit the growth of the animals.

Conventionally, feed is supplied through an elongate feed crib, which allows animals to feed themselves. However, in case of insufficiency in number or size of the feed crib, animals may push each other for feeding, leading to fall and injury of animals and eventually causing an economic loss of animal owner or feeder. Further, since the site of feeding is crowded and concentrated, occupation of the site by some of the animals having large sizes for solely feeding may be found, making it not possible for animals of small physical sizes to get enough feed and eventually lacking of sufficient nutrition for growth.

A conventional feed dispensing mechanism is structured to set feed at a high location and a force is applied to widely distribute the feed, so as to avoid feed snatching due to concentrated release of feed.

Further, a conventional feed dispensing mechanism employs a centrifugal force induced by rotation to dispense the feed loaded therein, and the mechanism comprises a receptacle chamber, which is provided with a number of doors. When the mechanism is rotated to reach a predetermined speed, the feed forces the doors to open and is thus dispensed. However, such a conventional mechanism is disadvantageous in that when the quantity of feed received therein is small, even when the rotational speed reaches the predetermined value, due to the insufficiency of weight, the doors cannot be pushed away and thus, the amount of feed dispensed is insufficient.

SUMMARY OF THE INVENTION

In view of the above problems, the present invention provides a feed carrier receptacle for use in a rotary feed dispensing mechanism, wherein with a driving device driving the present invention to rotate, the feed that is loaded therein can be dispensed outward through a centrifugal force. Since there is no need to push away doors, there is no potential problem of remaining residue of feed and the feed that is so dispensed is allowed to fly over a long distance so as to overcome the conventional drawbacks and to increase the distribution range of feed.

The present invention provides a feed carrier receptacle for use in rotary feed dispensing mechanism, which comprises a box, a feed loading opening, and a plurality of separation partitions, wherein the feed loading opening is formed in the box and the separation partitions are arranged inside the box in such a way that every two adjacent ones of the separation partitions and an inside surface of the box collectively form a feed compartment. Each feed compartment communicates the feed loading opening and forms a feed discharge opening and comprises a brush. Further, the brush is arranged adjacent to the feed discharge opening.

An objective of the present invention is that during rotation, the feed loaded in the box may be generally rotated in unison therewith so as to move toward the feed discharge opening. After being subjected to a frictional force with the brushes, the feed, when passing through the brushes, is caused to rotate by itself so as to fly over a long distance. Thus, the present invention overcomes the conventional drawbacks and expands the distribution range of feed.

Another objective of the present invention is to make each of the separation partitions in a curved form so as to allow the movement of feed smooth within the box.

A further objective of the present invention is to make a bottom of each feed compartment showing an upward inclination from inside toward the respective feed discharge opening, wherein when not put into rotation, the feed may accumulate in the inside portion without undesirably falling out.

A further objective of the present invention is to have each of the brushes made of an elastic material and showing a length that is substantially corresponding to a height of the respective feed discharge opening, whereby the feed, before exiting the feed discharge opening, is set in contact with the brush.

A further objective of the present invention is to provide a coupling section in a bottom of the box for coupling with a transmission device.

A further objective of the present invention is to arrange the coupling section at a center of the bottom of the box and extending into the box and to have each of the separation partitions extending outward from the coupling section that serves as a center so as to make the movement of feed smooth.

Yet a further objective of the present invention is to provide a box that comprises a cover and a carrier body so as to facilitate manufacturing and assembling of the box.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
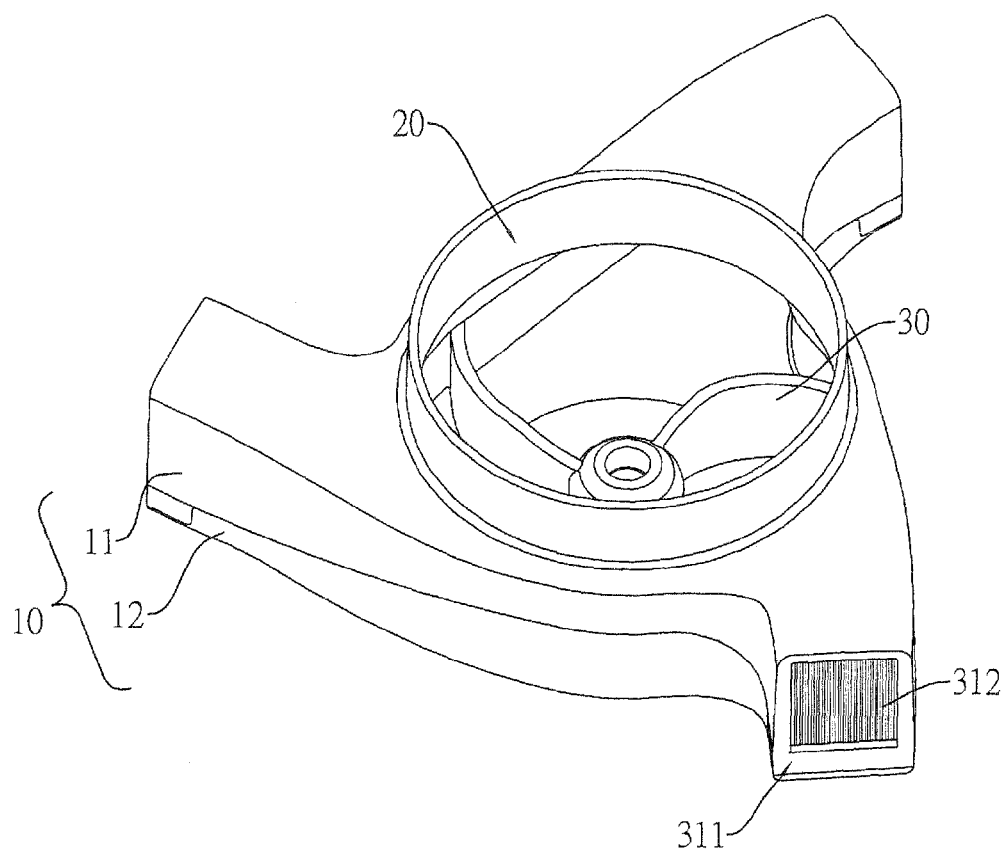
FIG. 1 is a perspective view of an embodiment of the present invention.
Figure 2:
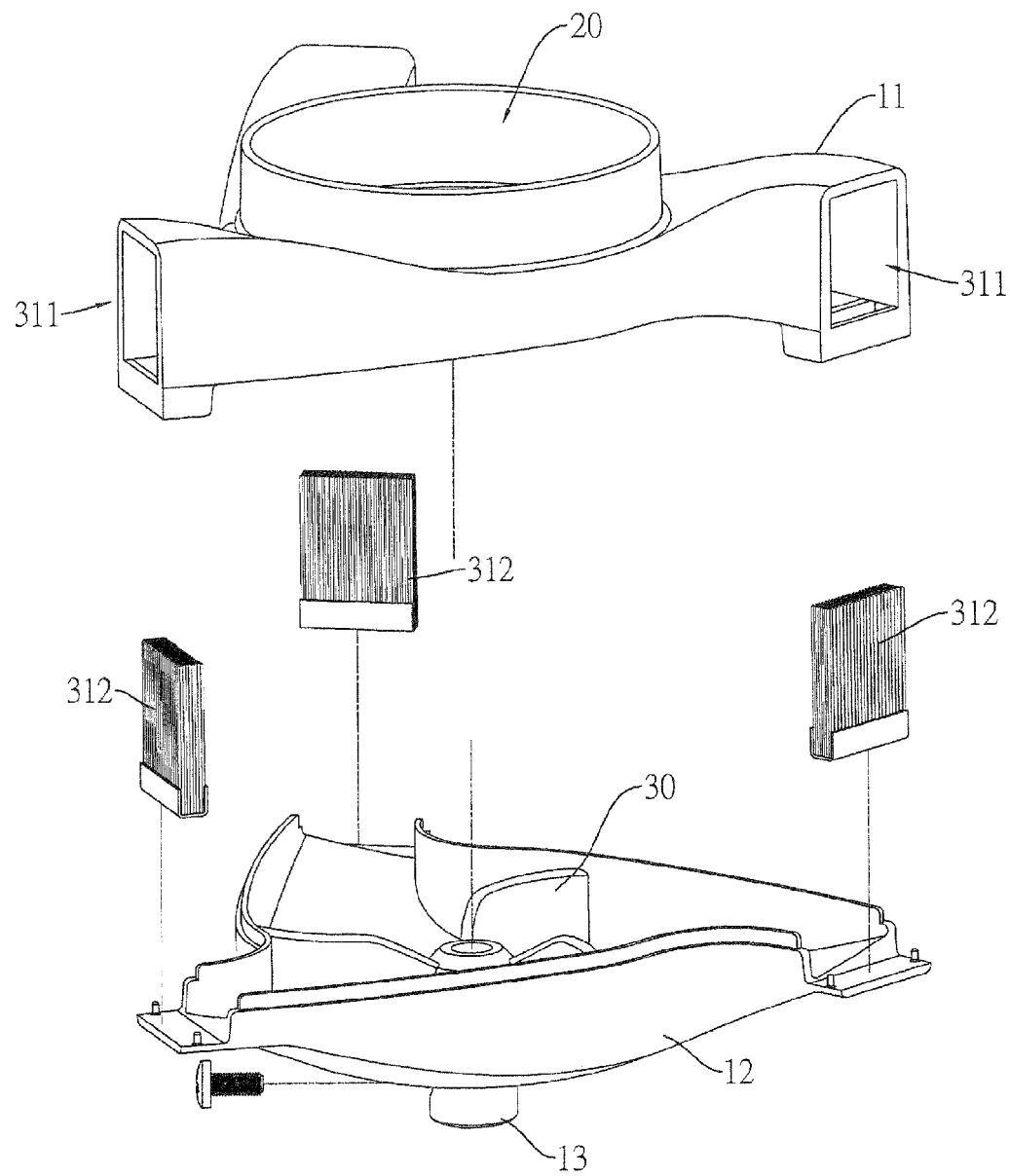
FIG. 2 is an exploded view of the embodiment of the present invention.
Figure 3:
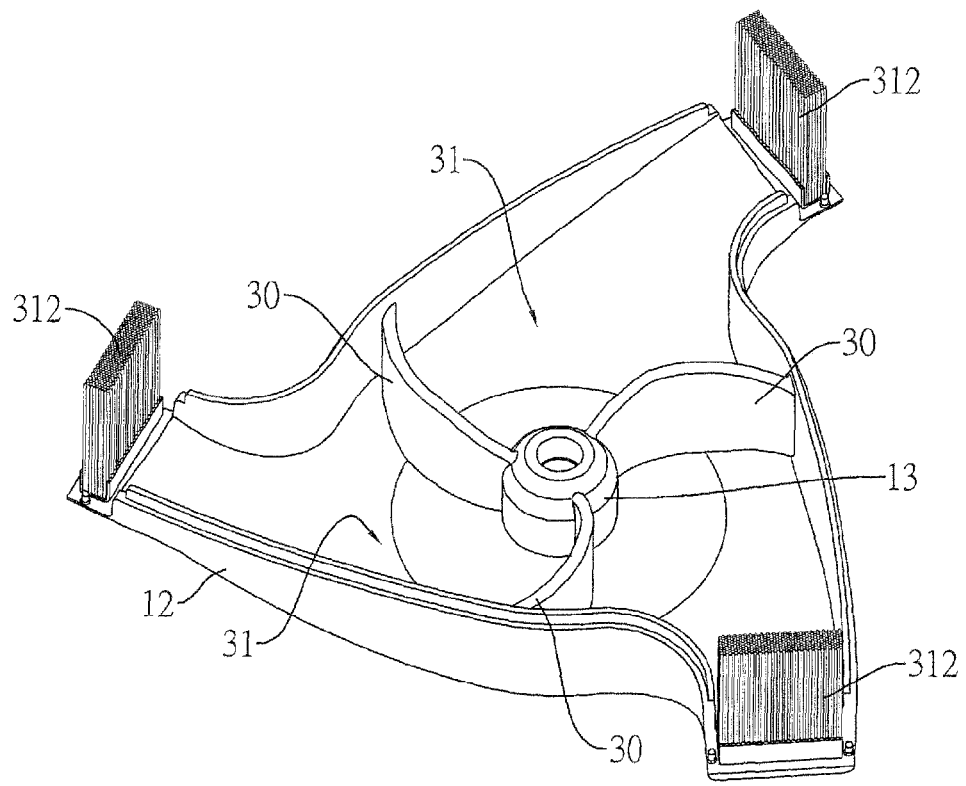
FIG. 3 is a perspective view of a carrier body of the embodiment of the present invention.
Figure 4:
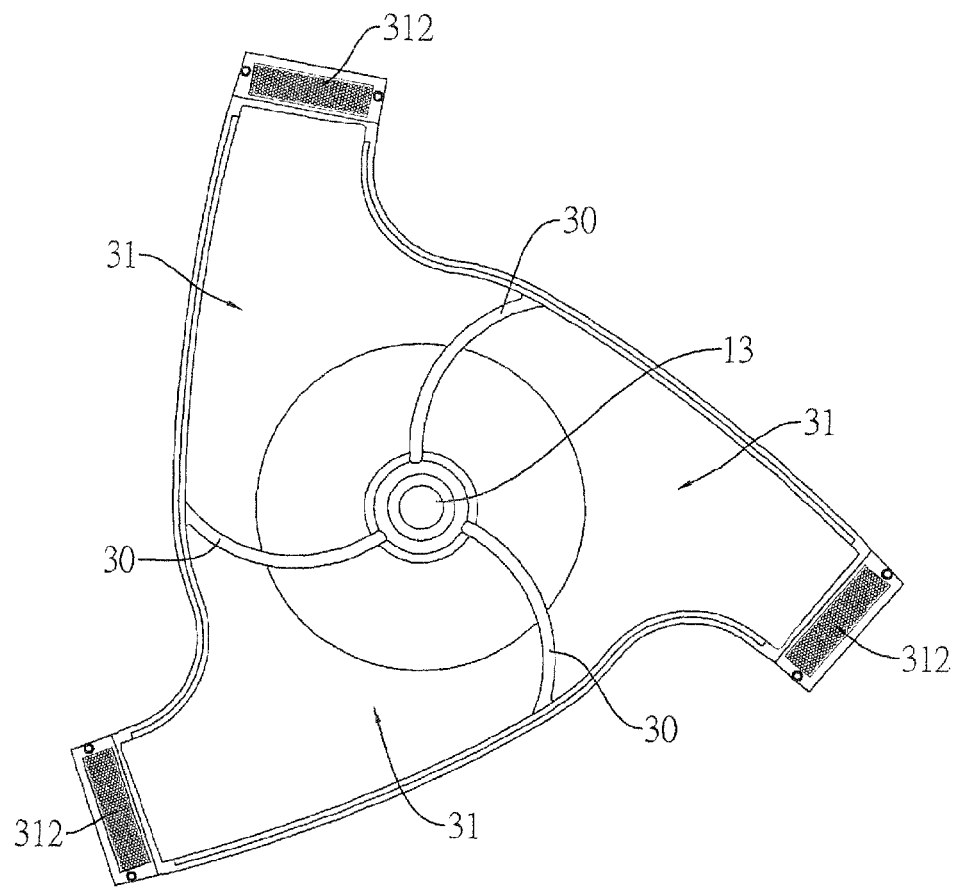
FIG. 4 is a top plan view of the carrier body of the embodiment of the present invention.

Reference is now made to FIG. 1, which is a perspective view of an embodiment of the present invention, FIG. 2, which is an exploded view of the embodiment of the present invention, FIG. 3, which is a perspective view of a carrier body of the embodiment of the present invention, and FIG. 4, which is a top plan view of the carrier body of the embodiment of the present invention.

The embodiment of the present invention is applicable to a feed carrier receptacle of rotary feed dispensing mechanism and comprises a box 10, a feed loading opening 20, and a plurality of separation partitions 30. The feed loading opening 20 is formed in the box 10 to allow feed to be loaded through the feed loading opening 20. The separation partitions 30 are arranged inside the box 10 and every two adjacent ones of the separation partitions 30 and an inside surface of the box 10 collectively form a feed compartment 31. Each feed compartment 31 communicates the feed loading opening 20 and forms a feed discharge opening 311 and is provided with a brush 312. The brush 312 is arranged adjacent to the feed discharge opening 311.

Figure 5:
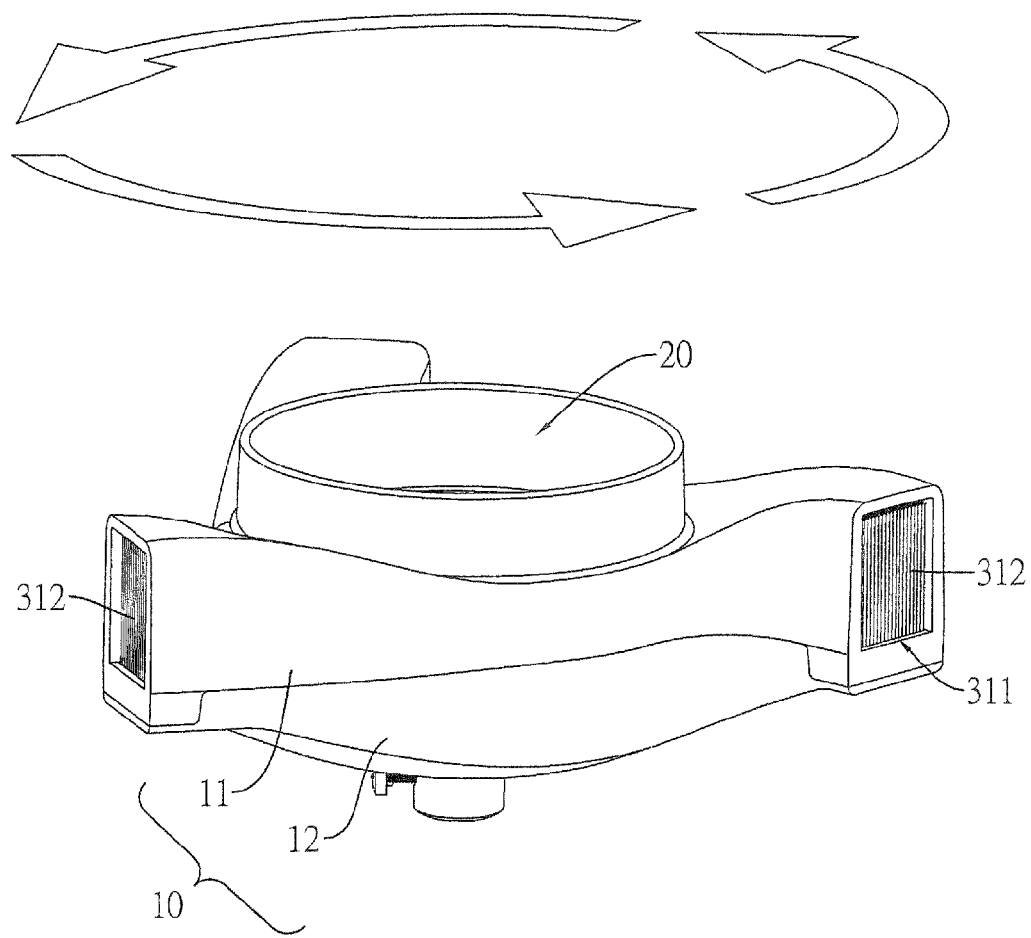
FIG. 5 is a perspective view illustrating direction of rotation of the embodiment of the present invention.
Figure 6:
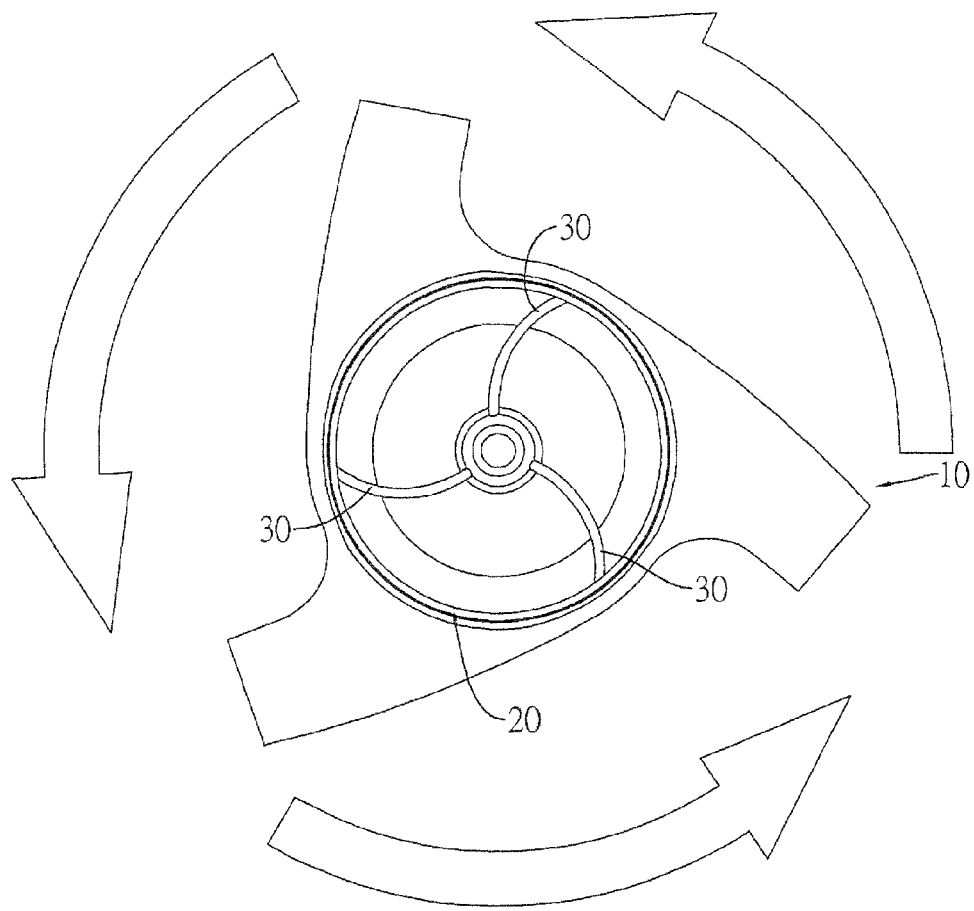
FIG. 6 is a top plan view illustrating the direction of rotation of the embodiment of the present invention.

Referring to FIGS. 5 and 6, which are respectively a perspective view and a top plan view illustrating direction of rotation, feed, when loaded through the feed loading opening 20, is allowed to get into the feed compartments 31. With the embodiment being driven by a driving device to take rotation (in a direction indicated by arrows), the feed received in the feed compartments 31 induces a centrifugal force with the rotation so as to move in a direction toward the feed discharge openings 311 to pass through the brushes 312 and be subsequently dispensed outward to realize distribution of feed. The feed, when contacting the brushes 312 and inducing a frictional force therewith, is caused to rotate by itself so that a portion of the feed may fly a long distance to increase the distribution range of feed. Further, all the feed loaded in the embodiment of the present invention will move toward outside the feed discharge openings 311 and does not cause a problem of being not dispensed due to residual quantity being lower than a threshold.

Further, referring to FIGS. 3 and 4, each of the separation partitions 30 is of a curved form, and each feed discharge opening 311 is arranged to face one of the separation partitions 30, so that the movement of the feed inside the feed compartment 31 is made smooth and easy.

Referring to FIGS. 2 and 3, each feed compartment 31 is arranged to have bottom thereof showing an upward inclination from inside toward the feed discharge opening, so that when the embodiment of the present invention is not set in rotation, the feed is caused to accumulate inside the feed compartment 31 and thus preventing the feed from falling off the feed discharge opening 311. Further, each brush 312 is made of an elastic material and has a length substantially corresponding to the height of the feed discharge opening 311 so as to prevent birds or insects from invading the feed discharge opening 311.

Figure 7:
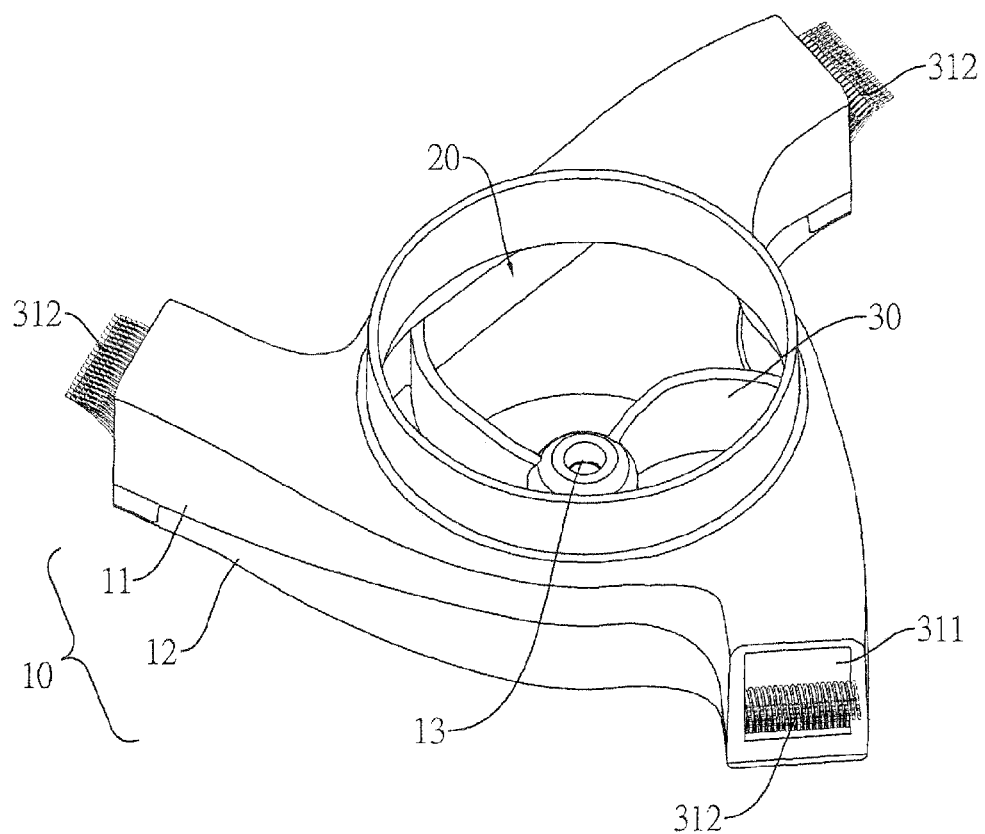
FIG. 7 is a perspective view illustrating the rotation of the embodiment of the present invention.
Figure 8:
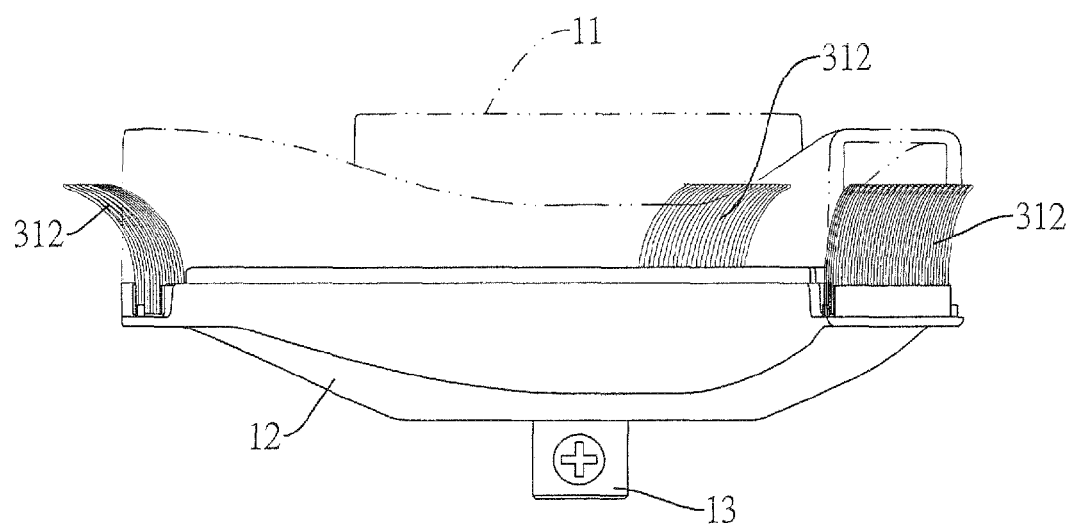
FIG. 8 is a side elevational view illustrating the rotation of the embodiment of the present invention.
Figure 9:
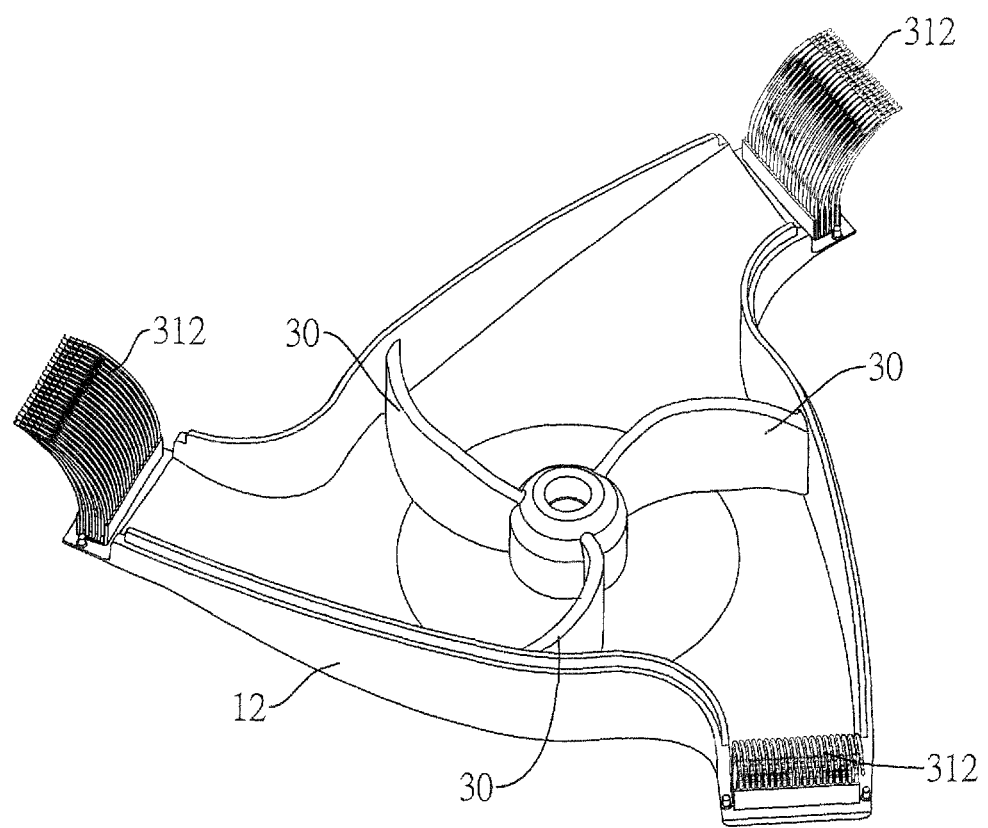
FIG. 9 is a top side perspective view of the carrier body, illustrating the rotation of the embodiment of the present invention.

FIGS. 7-9 illustrate the condition of the embodiment of the present invention when put into rotation. When the embodiment of the present invention is acted upon by an external force to take rotation, each brush 312 is affected by the centrifugal force. Further, due to the outward movement of the feed, a free end of the brush 312 is acted upon by the force to deflect outward. Meanwhile, due to a force induced by the elasticity, the brush 312, when contacting and causing frictional engagement with the feed, makes the feed rotating more powerful to fly over a longer distance.

Further, as shown in FIGS. 2 and 4, the box 10 forms in the bottom thereof a coupling section 13 for coupling with a transmission device (not shown). The coupling section 13 is preferably arranged at a center of the bottom of the box 10 and extends into the box 10. Each of the separation partitions 30 extends outwards from the coupling section 13 that serves as a center so as to make the movement of the feed smooth.

Further, referring to FIG. 2, the box 10 comprises a top cover 11 and a carrier body 12. The top cover 11 and the carrier body 12 are combinable with each other to form the box 10, wherein the feed loading opening 20 and the feed discharge openings 311 are formed in the top cover, while the brushes 312, the coupling section 13, and the separation partitions 30 are arranged in the carrier body 12. This arrangement facilitates manufacturing and assembling and makes maintenance and repairing easy.

The description of the embodiment indicates that the present invention allows feed to fly over a longer distance and increases distribution area of feed so as to overcome the problems of the conventional device.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A feed carrier receptacle for use in rotary feed dispensing mechanism, comprising:
a box;
a feed loading opening, which is formed in the box; and
a plurality of separation partitions, which is arranged inside the box, every two adjacent ones of the separation partitions and an inside surface of the box collectively forming a feed compartment, each of the feed compartments being in communication with the feed loading opening and forming a feed discharge opening and comprising a brush, the brush being arranged adjacent to the feed discharge opening;
wherein each of the separation partitions is of a curved form, each of the feed compartments is arranged to have a bottom thereof showing an upward inclination from inside toward the feed discharge opening, and each of the feed compartments is arranged to have a bottom thereof showing an upward inclination from inside toward the feed discharge opening.

2. The feed carrier receptacle for use in rotary feed dispensing mechanism according to claim 1, wherein each of the feed discharge openings is arranged to face one of the separation partitions.

3. The feed carrier receptacle for use in rotary feed dispensing mechanism according to claim 2, wherein the box forms in a bottom thereof a coupling section adapted to couple with a transmission device.

4. The feed carrier receptacle for use in rotary feed dispensing mechanism according to claim 3, wherein the coupling section is arranged at a center of the bottom of the box and extends into the box, each of the separation partitions extending outward from the coupling section that serves as a center.

5. The feed carrier receptacle for use in rotary feed dispensing mechanism according to claim 4, wherein the box comprise a top cover and a carrier body, the top cover being combinable with the carrier body, the feed loading opening and the feed discharge openings being formed in the top cover, the brushes and the coupling section being formed in the carrier body.

* * * * *